(12) United States Patent
Li et al.

(10) Patent No.: US 8,475,911 B2
(45) Date of Patent: Jul. 2, 2013

(54) DEVICE HOUSING AND MANUFACTURING METHOD FOR FABRICATING THE SAME

(75) Inventors: Wei Li, Shenzhen (CN); Zhong-Cheng Wu, Shenzhen (CN); Yan-Zong Yang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 791 days.

(21) Appl. No.: 12/603,163

(22) Filed: Oct. 21, 2009

(65) Prior Publication Data
US 2010/0104833 A1    Apr. 29, 2010

(30) Foreign Application Priority Data
Oct. 24, 2008  (CN) .......................... 2008 1 0305188

(51) Int. Cl.
*B32B 3/10*    (2006.01)
(52) U.S. Cl.
USPC ........ 428/195.1; 428/141; 428/156; 428/201; 428/203; 428/209

(58) Field of Classification Search
USPC ...................................... 428/195.1
See application file for complete search history.

(56) References Cited

U.S. PATENT DOCUMENTS 5,468,540 A * 11/1995  Lu ................................. 428/156
6,490,819 B1 * 12/2002  Kumata et al. ................... 40/615

OTHER PUBLICATIONS http://www.merriam-webster.com/dictionary/reflect.*

* cited by examiner

*Primary Examiner* — Mark Ruthkosky
*Assistant Examiner* — Christopher Polley
(74) *Attorney, Agent, or Firm* — Altis Law Group, Inc.

(57) ABSTRACT

A device housing and a manufacturing method for fabricating the device housing are provided. The device housing includes a transparent substrate, a first decorative coating formed on the transparent substrate, a second decorative coating formed on the first decorative coating and the transparent substrate, and a third decorative coating formed on the first decorative coating and the second decorative coating. The first decorative coating has a grid pattern appearance. The second decorative coating is light reflective. The third decorative coating has a color that contrasts against the first decorative coating.

12 Claims, 8 Drawing Sheets

DEVICE HOUSING AND MANUFACTURING METHOD FOR FABRICATING THE SAME

BACKGROUND

1. Technical Field

The present disclosure relates to a device housing and a manufacturing method for fabricating the same.

2. Description of Related Art

Device housings for portable electronic devices are usually decorated to enhance the aesthetic appearance by directly coating two-dimensional patterns on the exterior surfaces. However, regarding decorations of three-dimensional grid patterns, the typical technology lacks an easy, effective and low-cost fabricating method. For example, it is costly to laser engrave three-dimensional grid patterns at the exterior surface of the device housing.

Therefore, there is room for improvement within the art.

BRIEF DESCRIPTION OF THE DRAWING

Many aspects of the new device housing and manufacturing method for fabricating the same can be better understood with reference to the following drawings. The components in the drawings are not necessarily drawn to scale, the emphasis instead being placed upon clearly illustrating the principles of the new device housing and manufacturing method for fabricating the same. Moreover, in the drawings, like reference numerals designate corresponding parts throughout the several views.

DETAILED DESCRIPTION

Figure 1:
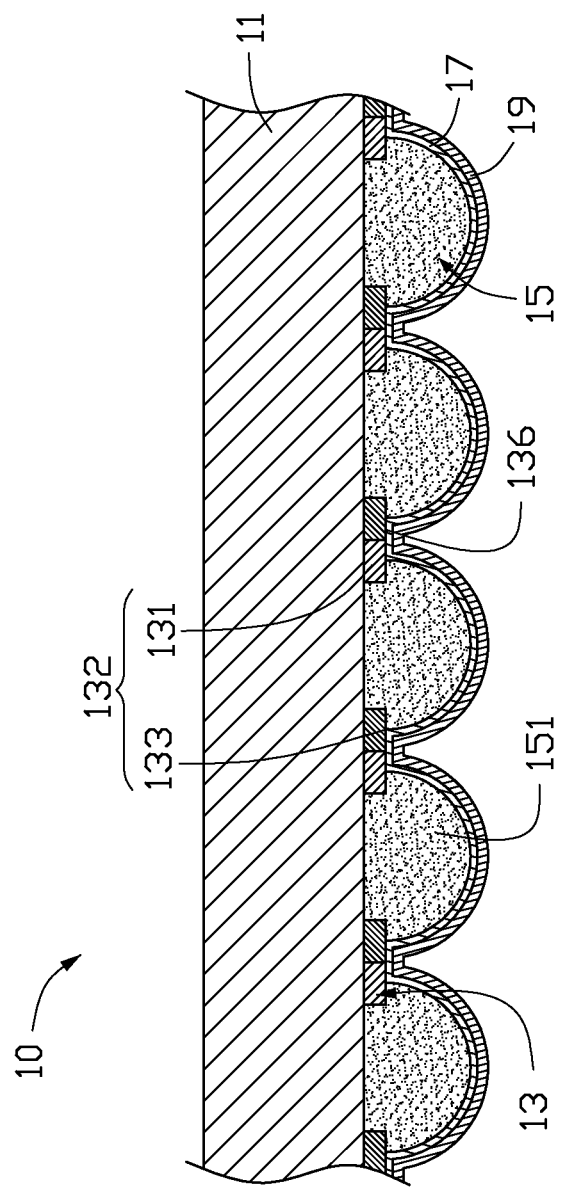
FIG. 1 is a cross-sectional view of a device housing according to an exemplary embodiment.
Figure 2:
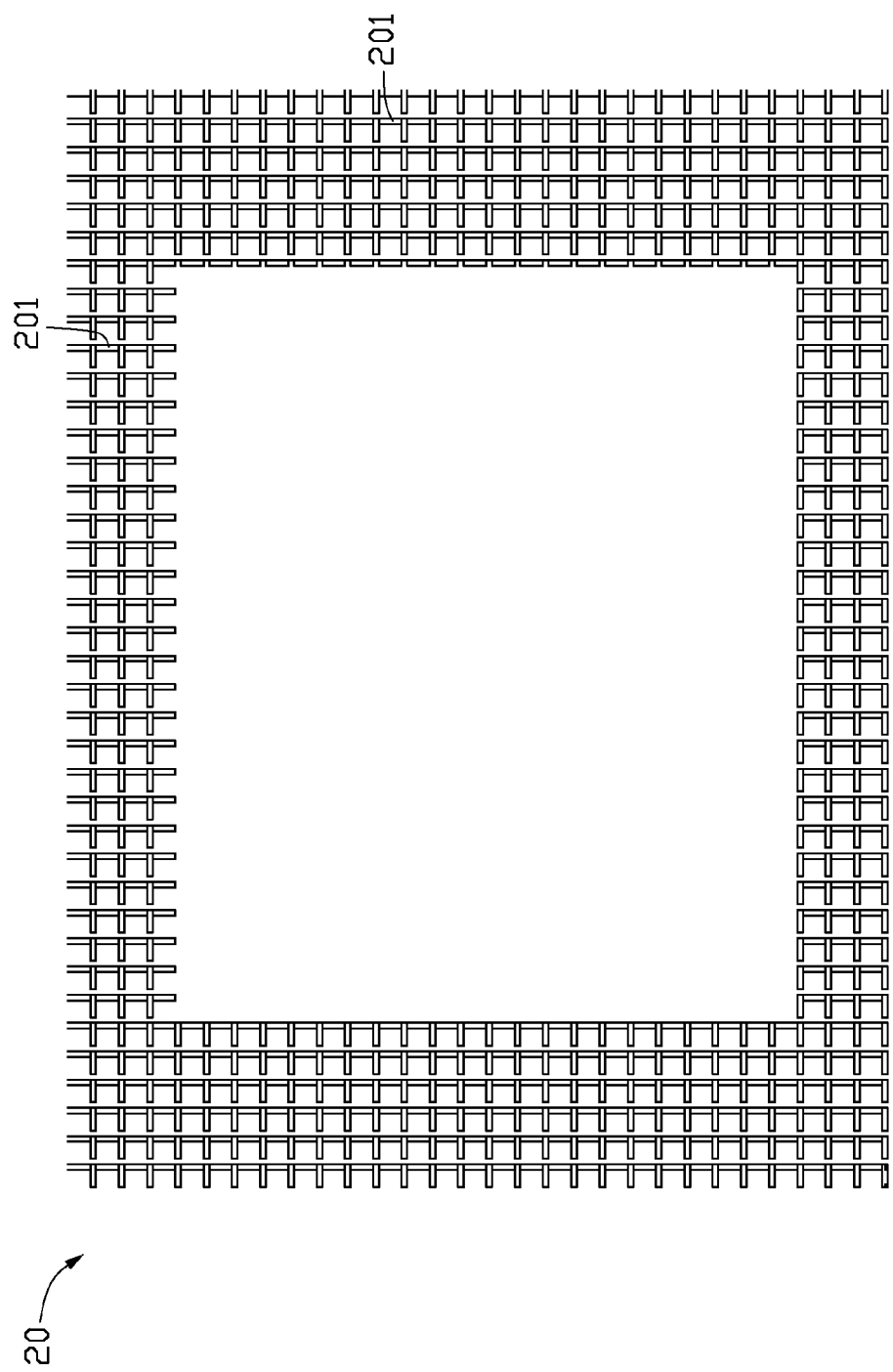
FIG. 2 is a planar view of a portion of a first printing plate.
Figure 3:
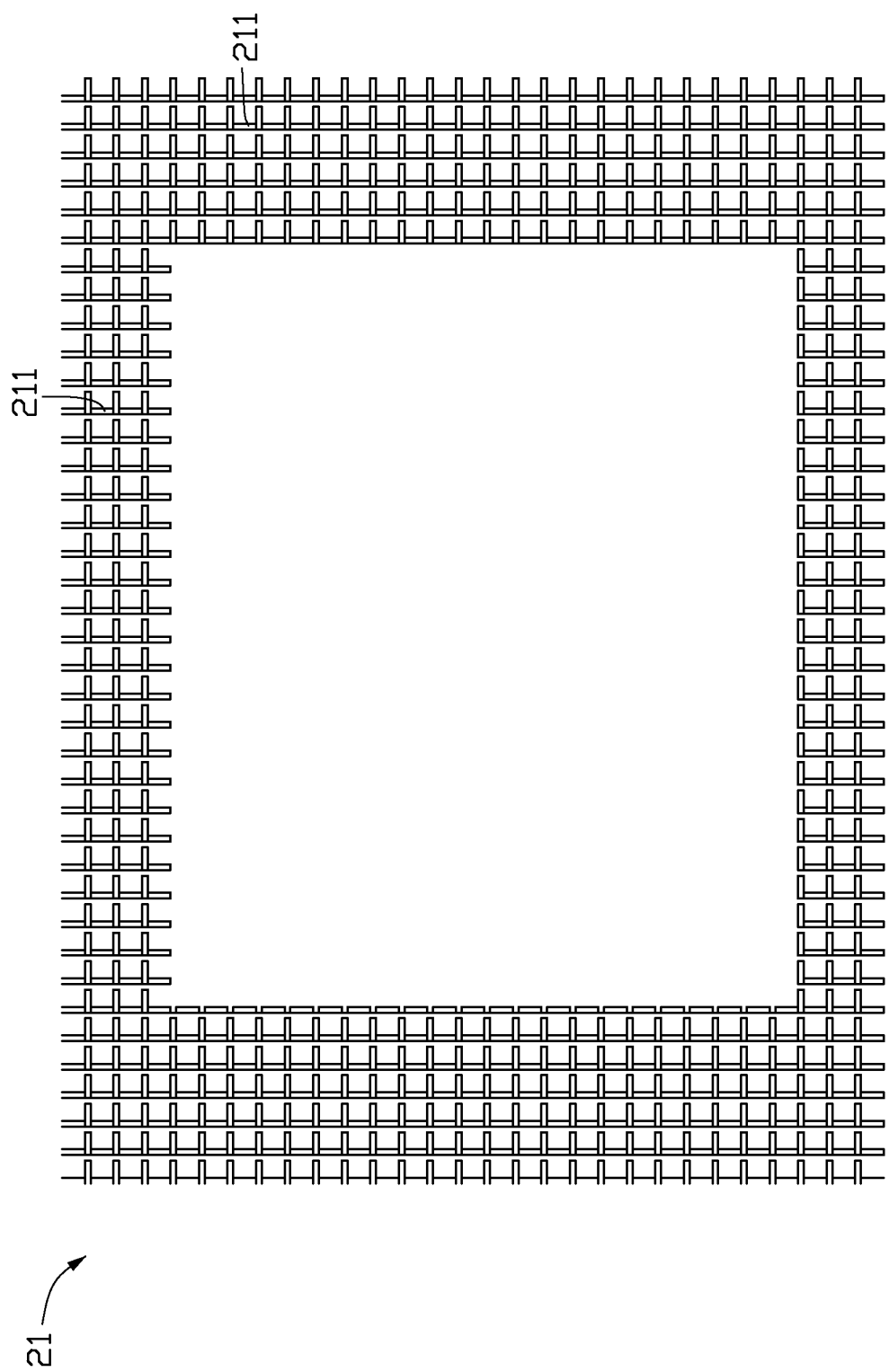
FIG. 3 is a planar view of a portion of a second first printing plate.
Figure 4:
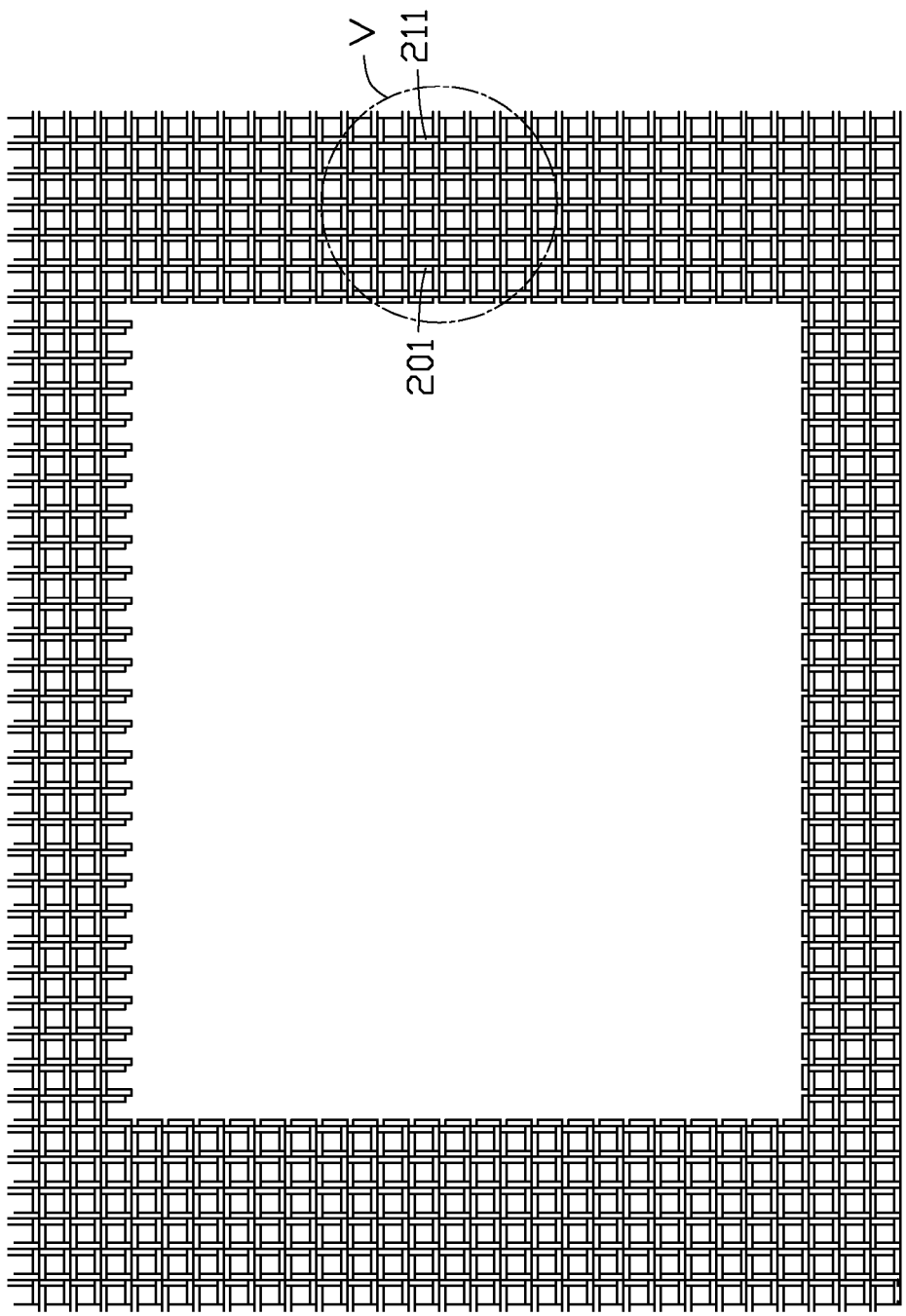
FIG. 4 is a planar view of the first printing plate stacked on the second printing plate.
Figure 5:
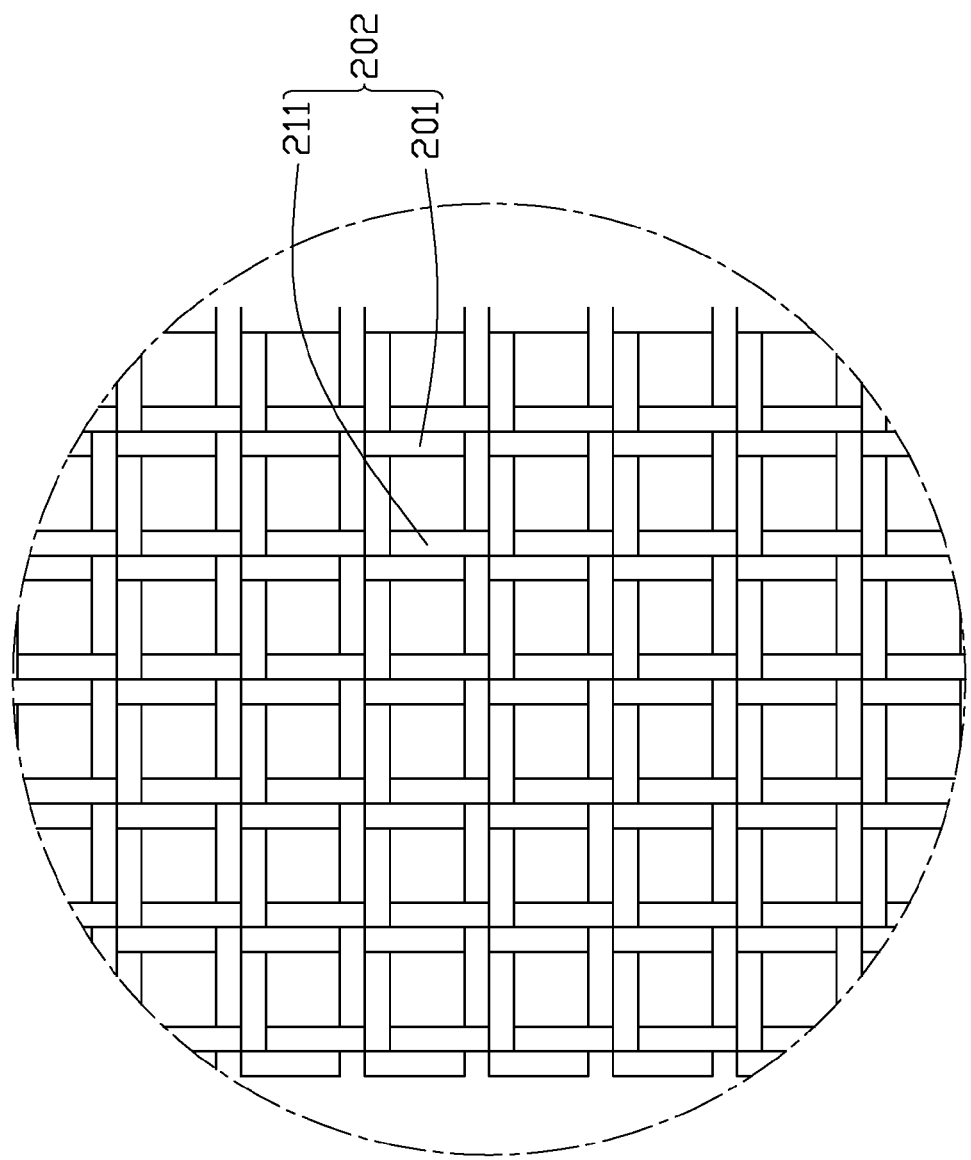
FIG. 5 is an enlarged view of section V illustrated in FIG. 4.

FIG. 1 shows an exemplary device housing 10 including a transparent substrate 11, a first decorative coating 13 formed on the transparent substrate 11, a second decorative coating 15 formed on the first decorative coating 13, a third decorative coating 17 formed on the second decorative coating 15, and a protective coating 19 formed on the third decorative coating 17.

The substrate 11 can be a transparent plastic substrate molded from one or more plastics selected from a group consisting of polyethylene (PE), polyamide (PA), polycarbonate (PC), acrylonitrile-butadiene-styrene (ABS), polymethyl methacrylate (PMMA) and polyethylene terephthalate (PET).

The first decorative coating 13 includes a plurality of first ink coating sections 131 and a plurality of second ink coating sections 133. The first ink coating sections 131 and the second ink coating sections 133 have different colors. Each of the first ink coating sections 131 abuts an adjacent one of the second ink coating sections 133, and the first ink coating sections 131 and the second ink coating sections 133 cooperatively enclose a plurality of grid sections 132.

The second decorative coating 15 is made of ultraviolet (UV) curing ink. The second decorative coating 15 covers the first decorative coating 13 and includes an array of substantially semi-spherical second decorative coating sections 151 corresponding to the plurality of grid sections 132. The second decorative coating sections 151 are substantially evenly spaced from each other. Each of the second decorative coating sections 151 fills and envelops the corresponding grid section 132.

The third decorative coating 17 can be a metallic coating with a metallic appearance that contrasts against the first decorative coating 13. The third decorative coating 17 can be made of one material selected from a group consisting of chromium (Cr), copper (Cu), aluminum (Al), tin (Sn), and stainless steel. Alternatively, the third decorative coating 17 can be a plastic coating having a vivid color that contrasts against the first decorative coating 13, such as being colored white. The third decorative coating 17 covers the second decorative coating 15 and sections 136 of the first decorative coating 13 exposed from the second decorative coating 15.

The protective coating 19 can be made of a transparent ink and protects the third decorative coating 17 from, for example, wear. It is to be understood that the protective coating 19 can be omitted.

Due to the color that contrasts of the third decorative coating 17 against the first decorative coating 13 and light reflection of the second decorative coating 15, the device housing 10 can have a three-dimensional grid appearance at its exterior surface.

A manufacturing method for fabricating the device housing 10 includes the following steps.

The transparent substrate 11 is provided e.g., by molding plastics. As shown in FIGS. 2-5, a first printing plate 20 and a second printing plate 21 are provided. The first printing plate 20 defines a plurality of first coating slits 201, and the second printing plate 21 defines a plurality of second coating slits 211. The first coating slits 201 and the second coating slits 211 correspond to the first ink coating sections 131 and the second ink coating sections 133, and thus, when the first printing plate 20 is stacked to the second printing plate 21, a plurality of grid slit units 202 are defined corresponding to the grid sections 132. During this printing process, the first printing plate 20 is placed on the substrate 11. Inks with a predetermined color are printed on the substrate 11 through the first printing plate 20, forming the first ink coating sections 131 on the substrate 11. The second printing plate 21 is placed on the substrate 11. Inks with another different predetermined color are printed on the substrate 11 through the second printing plate 21, forming the second ink coating sections 133 on the substrate 11. Accordingly, the first decorative coating 13 is printed on the substrate 11, forming the plurality of grid sections 132 on the substrate.

Figure 6:
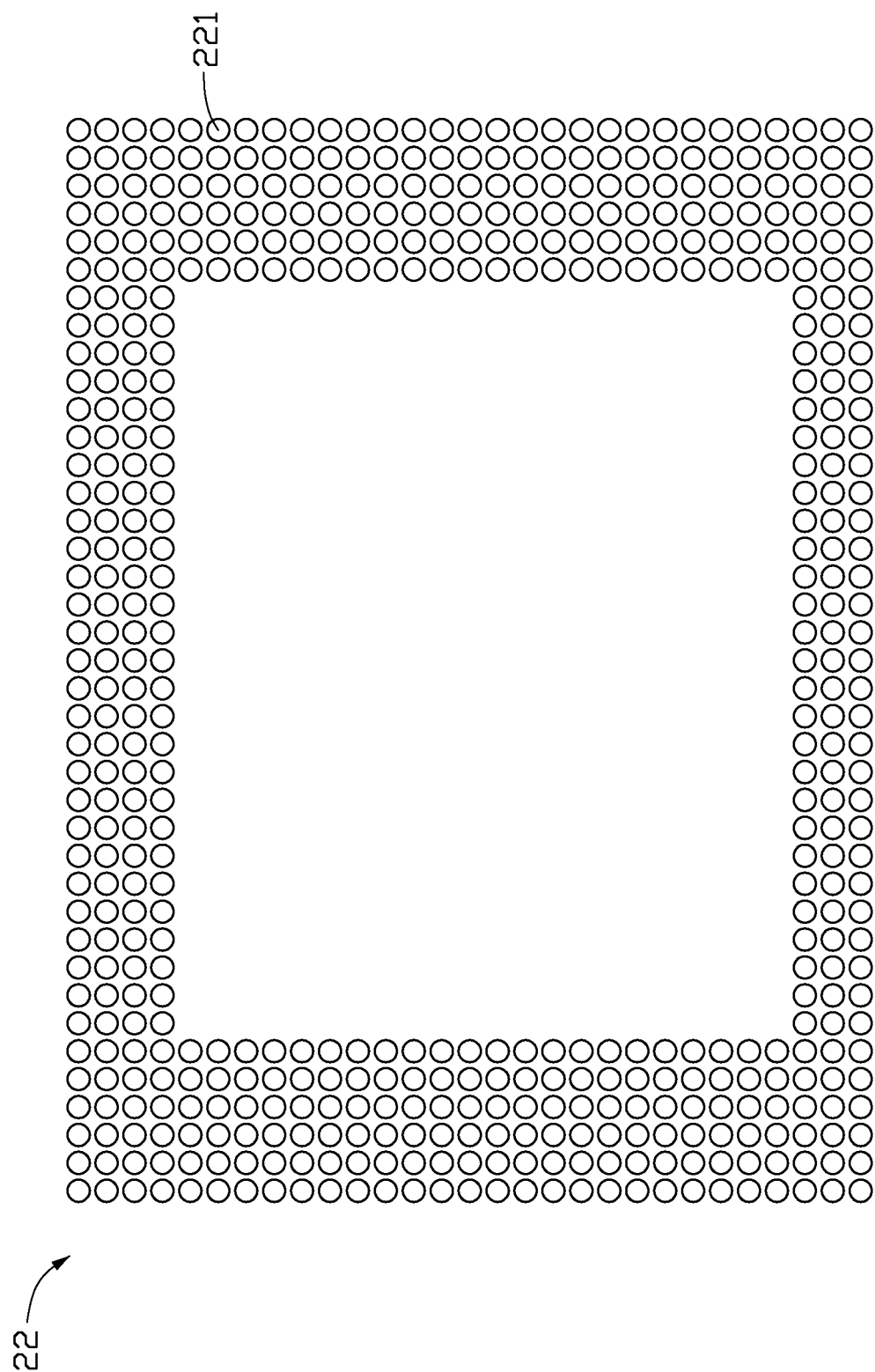
FIG. 6 is a planar view of a portion of a third printing plate.
Figure 7:
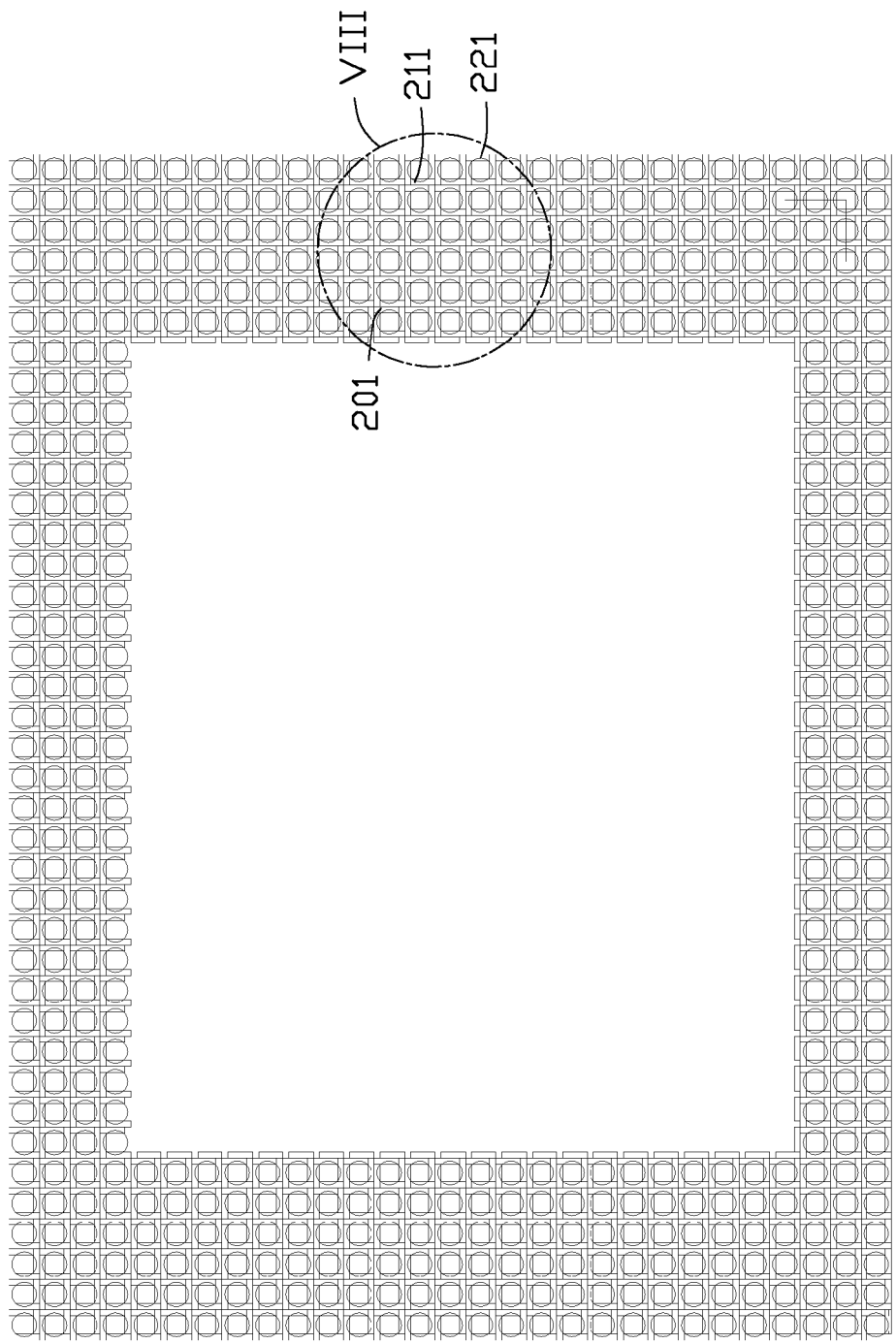
FIG. 7 is a planar view of the third printing plate stacked on the first printing plate, and further on the second printing plate.
Figure 8:
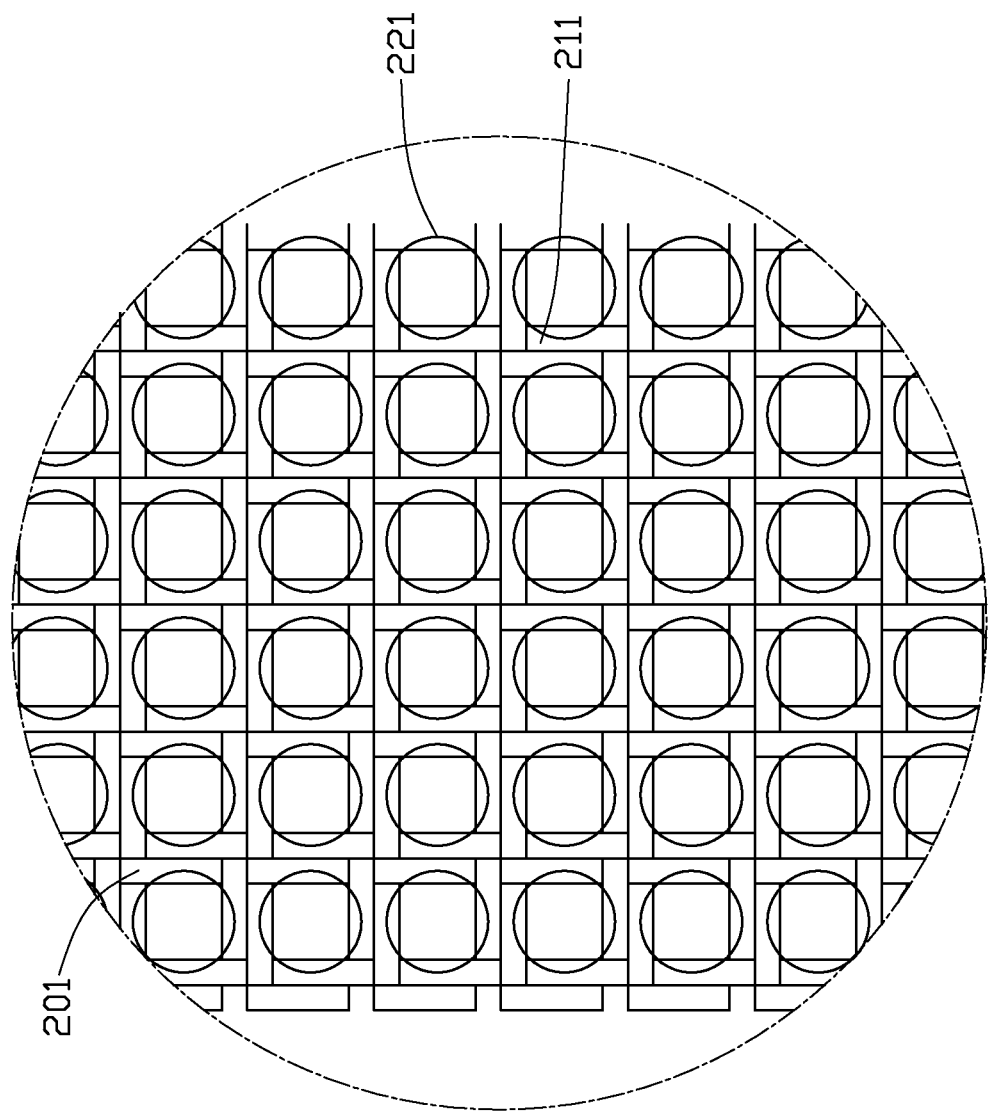
FIG. 8 is an enlarged view of section VIII illustrated in FIG. 7.

Referring to FIG. 6, a third printing plate 22 is provided. The third printing plate 22 defines an array of substantially evenly spaced round apertures 221. As shown in FIGS. 7 and 8, the apertures 221 correspond to the second decorative coating sections 151, and thus, when the first printing plate 20, the second printing plate 21, and the third printing plate 22 are stacked, the apertures 221 align above the grid slit units 202, respectively. During this printing process, the third printing plate 22 is placed on the substrate 11. UV curing inks are printed and cured by irradiating UV light on the first decorative coating 13 through the third printing plate 22. In this case, the second decorative coating sections 151 are formed on the first decorative coating 13, and the second decorative coating sections 151 fill and envelop the grid sections 132, respectively.

The third decorative coating 17 is formed on the second decorative coating 15 and the first decorative coating 13 for example by coating a plastic material or vacuum evaporating a metallic material. The protective coating 19 is formed by coating transparent inks on the third decorative coating 17.

It is to be understood, however, that even through numerous characteristics and advantages of exemplary embodiments have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A device housing, comprises:
   a transparent substrate having at least one side defining a surface;
   a first decorative coating formed on the surface of the transparent substrate, the first decorative coating having a grid pattern appearance, the first decorative coating comprising a plurality of grid sections;
   a second decorative coating formed on the same side of the transparent substrate as the first decorative coating and on the first decorative coating, the second decorative coating comprising an array of hemi-spherical second decorative coating sections, the second decorative coating sections filling the grid sections; and
   a third decorative coating formed on and directly touching the first decorative coating and the second decorative coating, the third decorative coating having a color that contrasts against the first decorative coating.

2. The device housing as claimed in claim 1, wherein the second decorative coating is made of UV curing ink.

3. The device housing as claimed in claim 2, wherein the second decorative coating sections are evenly spaced from each other.

4. The device housing as claimed in claim 1, wherein the first decorative coating comprises a plurality of first ink coating sections and a plurality of second ink coating sections, the plurality of grid sections are formed by the first ink coating sections and the second ink coating sections, respectively.

5. The device housing as claimed in claim 4, wherein the plurality of first ink coating sections have a color different from the color of the plurality of second ink coating sections.

6. The device housing as claimed in claim 4, wherein each of the first ink coating sections abuts an adjacent one of the second ink coating section.

7. The device housing as claimed in claim 1, wherein the third decorative coating is made of one material selected from the group consisting of chromium (Cr), copper (Cu), aluminum (Al), tin (Sn), and stainless steel.

8. The device housing as claimed in claim 1, wherein the third decorative coating is a plastic coating.

9. The device housing as claimed in claim 1, further comprising a protective coating made of a transparent ink.

10. The device housing as claimed in claim 1, wherein the substrate is made of one or more plastics selected from the group consisting of polyethylene (PE), polyamide (PA), polycarbonate (PC), acrylonitrile-butadiene-styrene (ABS), polymethyl methacrylate (PMMA) and polyethylene terephthalate (PET).

11. The device housing as claimed in claim 1, wherein the third decorative coating is opaque.

12. The device housing as claimed in claim 1, wherein the hemi-spherical second decorative coating sections act as a plurality of convex lens which makes the third decorative coating present a caved image, and allows the first decorative coating to present a raised three-dimensional grid appearance.

* * * * *